(12) United States Patent
Hsieh

(10) Patent No.: US 7,242,283 B2
(45) Date of Patent: Jul. 10, 2007

(54) AUTOMOBILE STEERING LOCK WITH AN ALARM

(76) Inventor: Hui-Hua Hsieh, P.O. Box 90, Tainan City 70499 (TW)

( * ) Notice: Subject to any disclaimer, the term of this patent is extended or adjusted under 35 U.S.C. 154(b) by 206 days.

(21) Appl. No.: 11/177,401

(22) Filed: Jul. 11, 2005

(65) Prior Publication Data

US 2007/0008086 A1    Jan. 11, 2007

(51) Int. Cl.
*B60R 25/02* (2006.01)
*B60R 25/10* (2006.01)

(52) U.S. Cl. .................. 340/426.31; 340/426.11; 340/426.1; 70/209

(58) Field of Classification Search ......... 340/426.1, 340/426.11, 426.31; 70/209
See application file for complete search history.

(56) References Cited

U.S. PATENT DOCUMENTS

| | | | | |
|---|---|---|---|---|
| 5,258,741 A | * | 11/1993 | Fuller | 340/426.31 |
| 5,398,017 A | * | 3/1995 | Chen | 340/426.31 |
| 5,469,135 A | * | 11/1995 | Solow | 340/426.31 |
| D379,754 S | * | 6/1997 | Solow | D8/331 |
| 5,636,537 A | * | 6/1997 | Chen | 70/209 |
| 5,821,425 A | * | 10/1998 | Mariani et al. | 73/703 |
| 7,109,874 B2 | * | 9/2006 | Pilkington | 340/628 |

* cited by examiner

*Primary Examiner*—Jeffery Hofsass
*Assistant Examiner*—Anne V. Lai

(57) ABSTRACT

An anti-theft automobile steering wheel lock with an alarm includes an alarm and a lock body. The alarm set fixed on the lock body consists of a circuit board, a buzzer and a battery base. The circuit board possesses a microphone sensor, a vibrating sensor and a warning light. The warning light and the battery base are connected with the circuit board. In using, wrap a fitting member of the lock body around a part of the steering wheel of an automobile and power the alarm set in a detecting state. If a door of an automobile is opened by a thief, air current outside the automobile will flow into the interior of the automobile, inducing the microphone sensor to make the buzzer sound out for warning. If the body of an automobile is struck by a thief, the vibrating sensor will be induced to make the buzzer sound out.

1 Claim, 4 Drawing Sheets

AUTOMOBILE STEERING LOCK WITH AN ALARM

BACKGROUND OF THE INVENTION

1. Field of the Invention

This invention relates to an anti-theft automobile steering wheel lock with an alarm, particularly to one that includes an alarm set and a lock body. The alarm set fixed on the lock body is composed of a circuit board, a buzzer and a battery base. The circuit board possesses a microphone sensor, a vibrating sensor and a warning light. The warning light and the battery base are connected with the circuit board. In using, just wrap a fitting member of the lock body around a part of the steering wheel of an automobile and power the alarm set in a detecting state. In case that a door of an automobile is illegally opened by a thief, air current outside the automobile will flow right away through the door into the interior of the automobile and induce the microphone sensor to make the buzzer sound out for warning. Or, if the body of an automobile is struck or punched by a thief, the vibrating sensor will be induced to make the buzzer sound out for warning, too. Therefore, the invention really upgrades a lot anti-theft effectiveness.

2. Description of the Prior Art

Common conventional automobile steering locks, gear locks or accelerator locks can only lock up a steering wheel, a gear or an accelerator respectively, having no other extra functions. They only delay a little while unlocking time in case a thief tries to steal an automobile, impossible to obtain a 100% anti-theft effect. In order to improve the defects of the conventional automobile steering locks mentioned above, the present invention has been devised to offer plural ways of warning after making experiments again and again.

SUMMARY OF THE INVENTION

The prime object of this invention is to offer an automobile steering wheel lock with an alarm.

The main characteristic of the invention is a lock body and an alarm set fixed on the lock body. The alarm set consists of a circuit board, a buzzer and a battery base. The circuit board possesses a microphone sensor, a vibrating sensor and a warning light, with the warning light and the battery base connected with the circuit board.

Another characteristic of the invention is a lock body having a stationary base at its one end, a fitting member at its other end and an elongated rod located in its interior and connected with the fitting member, and an alarm set fixed on the stationary base and consisting of a cover, a circuit base, a buzzer, a battery and a touching switch. The circuit board possesses a microphone sensor, a vibrating sensor, a warning light and an antenna. The warning light and the battery base are connected with the circuit board. The touching switch connected with the circuit board has a fixing plate at its one end for fixing with the stationary base and extends into the interior of the lock body with its other end, able to contact with the elongated rod. The cover is to cover on the circuit board and fixed with the lock body. Additionally, a plastic shielding plate is fixed with the tapered end of the cover for shielding the antenna.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
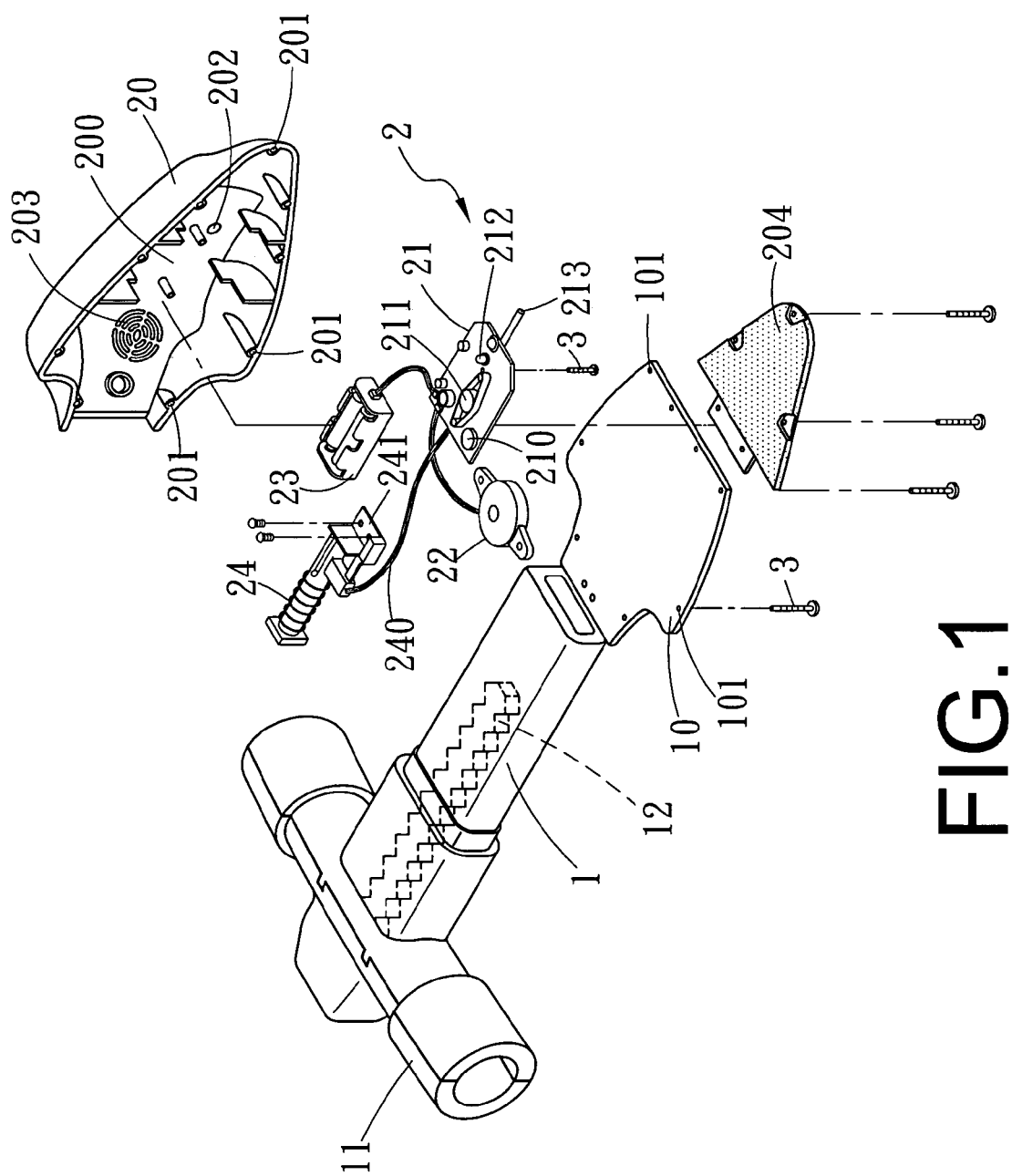
FIG. 1 is an exploded perspective view of an automobile steering wheel lock with an alarm in the present invention.
Figure 2:
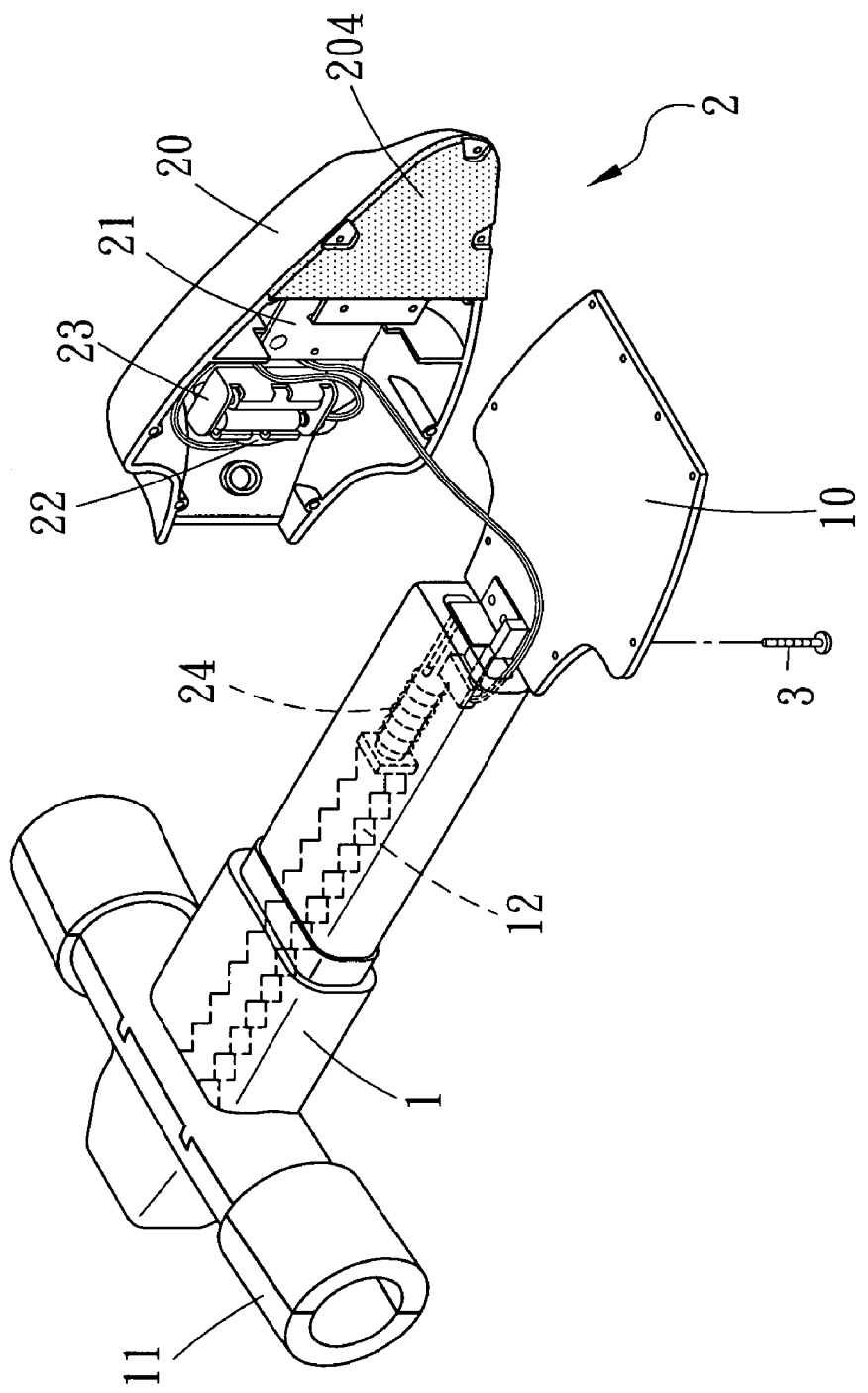
FIG. 2 is a perspective view of the automobile steering wheel lock with an alarm in the present invention, showing it being assembled.

A preferred embodiment of an automobile steering wheel lock in the present invention, as shown in FIGS. 1 and 2, includes a lock body consisting of a main body 1, a stationary base 10, a fitting member 11 and an elongated rod 12, and an alarm set 2 as main components.

The main body 1 is the main part of this lock.

The stationary base 10 located at one end of the main body 1 has plural bolt holes 101.

The fitting member 11 located near the other end of the main body 1 wraps around a part of the steering wheel of an automobile, having a conventional structure, a well-known art not to be described in detail here.

The elongated rod 12 set inside the main body 1 is connected together with the fitting member 11.

The alarm set 2 fixed on the stationary base 10 is composed of a cover 20, a circuit board 21, a buzzer 22, a battery base 23 and a touching switch 24. The cover 20 has a chamber 200 for containing the circuit board 21 and bored with plural bolt holes 201 aligned to the bolt holes 101 of the stationary base 10 to be screwed by plural bolts 3. In addition, the cover 20 has a light hole 202 and a trumpet hole 203 in its top, and a plastic shielding plate 204 at its tapered bottom. The circuit board 21 has a microphone sensor 210 able to magnify a signal in accordance with the variety of air currents, a vibrating sensor 211 able to magnify a signal in accordance with the variety of vibrations, a warning light 212 made of an LED and an antenna 213 at its one end.

The buzzer 22 is connected with the circuit board 21.

The battery base 23 is also connected with the circuit board 21.

The touching switch 24 linked with the circuit board 21 by a power wire 240 possesses a fixing plate 241 at its one end for fixing together with the stationary base 10, able to extend into the interior of the main body 1 with its other end to touch with the end of the elongated rod 12.

Figure 3:
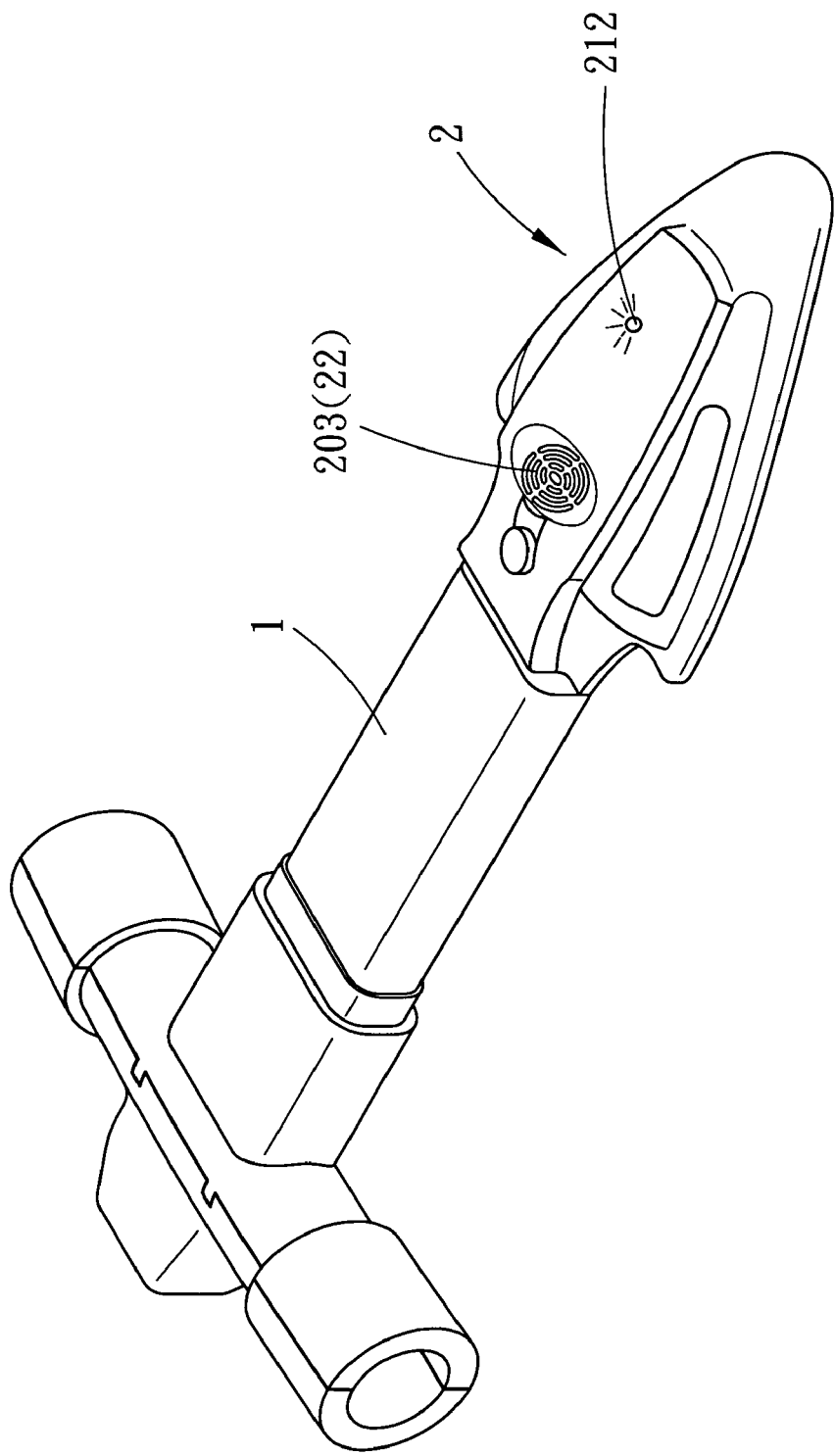
FIG. 3 is a perspective view of the automobile steering wheel lock with an alarm in the present invention, showing it in the assembled condition.

In assembling, with reference to FIGS. 1, 2 and 3, the circuit board 21, the buzzer 22 and the battery base 23 are first placed in the chamber 200. Next, the plastic shielding plate 204 is fixed with the cover 20 and kept just to cover the antenna 213 from being interfered by metallic material. The touching switch 24 is then put in the interior of the main body 1 until the fixing plate 241 is moved in place to be fixed with the stationary base 10 by bolts 3. Finally, the bolt holes 201 of the cover 20 are aligned to the bolt holes 101 of the stationary base 10 so that the alarm set 2 can be fixed on the stationary base 10 by the bolts 3.

Figure 4:
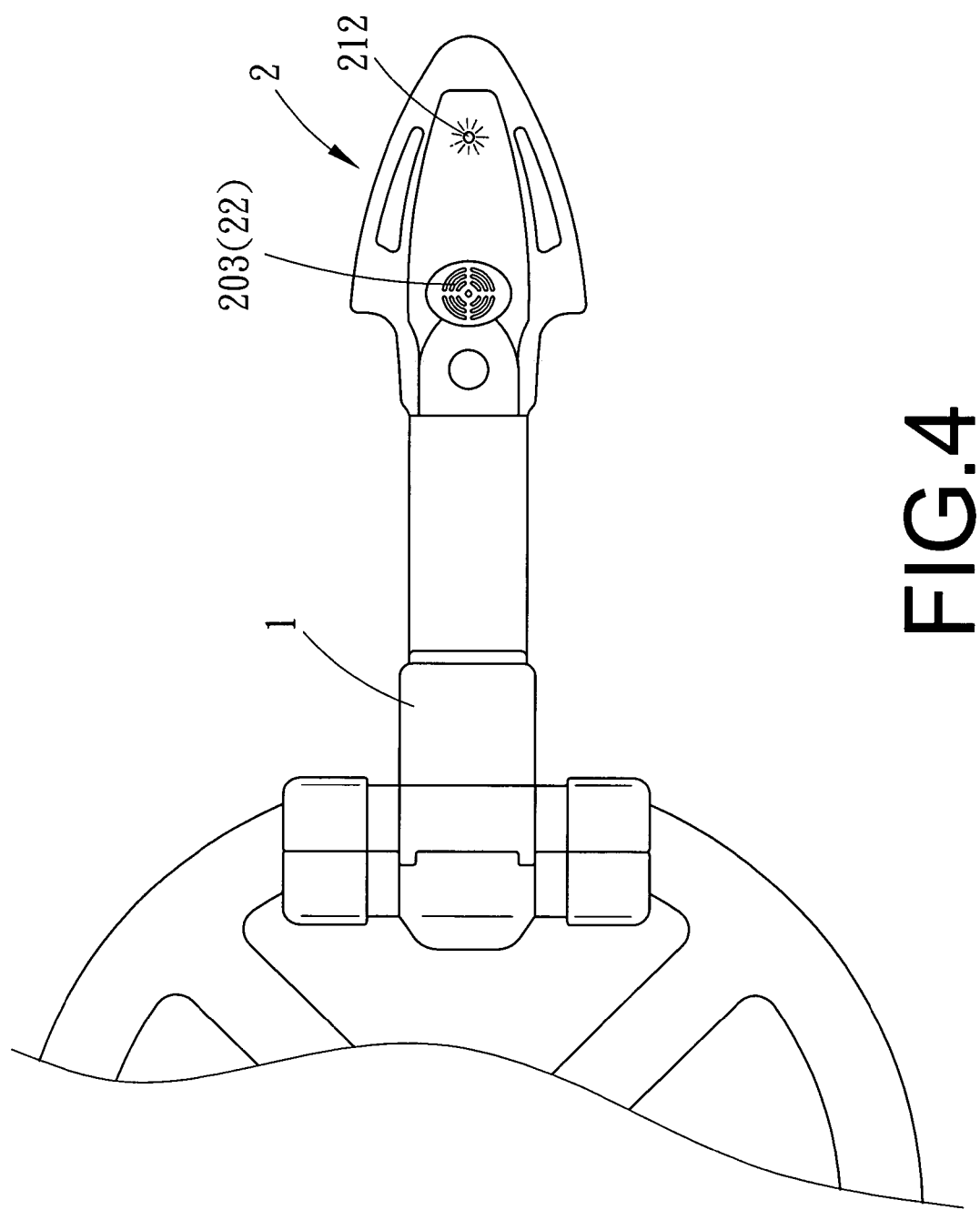
FIG. 4 is a perspective view of the automobile steering wheel lock with an alarm in the present invention, showing it locked on the steering wheel of an automobile.

In using, with reference to FIGS. 3 and 4, keep the two halves of the fitting member 11 of the lock body separated far enough to wrap up a part of a steering wheel of an automobile, then push the two halves of the fitting member 11 to tightly wrap up the part of the steering wheel and simultaneously to enable the elongated rod 12 to shift to contact with the touching switch 24 so that detecting is initiated with the warning light 212 lit up continuously or blindingly. In case that a door of an automobile is illegally opened by a thief, air current outside the automobile will flow right away through he door into the interior of the automobile and induce the microphone sensor 210 to make the buzzer 22 sound out for warning. Or, if the body of an automobile is illegally struck or punched by a thief, the vibrating sensor 211 will be induced to make the buzzer 22 sound out for warning, too.

In addition, a long-distance remote receiver can be provided for drivers. It can be simultaneously kept in detecting state and receive the signal transmitted from the antenna 213 while the touching switch 24 is in contact with the elongated rod 12 for using as mentioned above. Therefore, if a door of an automobile is illegally opened or the body of an automobile is struck or punched by a thief, not only the microphone sensor 210 but also the vibrating sensor 211 will be respectively induced to make the buzzer 22 sound out for warning, and the antenna 213 will shoot out a signal to inform the remote receiver for alerting.

While the preferred embodiment of the invention has been described above, it will be recognized and understood that various modifications may be made therein and the appended claims are intended to cover all such modifications that may fall within the spirit and scope of the invention.

What is claimed is:

1. An automobile steering lock with an alarm comprising:
    a lock body having main body, a stationary base, a fitting member and an elongated rod located in said main body and connected with said fitting member;

an alarm set fixed on said stationary base and consisting of a cover, a circuit board, a buzzer and a battery base and a touching switch, said circuit board having a microphone sensor, a vibrating sensor, a warning light and an antenna, said buzzer, said battery base, and said antenna all connected with said circuit board, said antenna having a fixing plate at one end for fixing together with said stationary base and extending into said lock body with the other end and able to contact with said elongated rod, said cover covering on said circuit board and fixed with said lock body and also fixed with a plastic shielding plate at its tapered end for shielding said antenna;

wherein said alarm set is immediately turned into a detecting state as long as said fitting member of said lock body is wrapped around a part of a steering wheel of an automobile and said elongated rod is pushed to contact with said touching switch; air current flows right away through a door into the interior of an automobile and inducing said microphone sensor to make said buzzer sound out for warning if the door is plied open; said vibrating sensor is induced to make said buzzer sound out for warning if the body of an automobile is illegally struck or punched by a thief; said antenna simultaneously sends out a signal to be received by a long-distance remote receiver for warning.

\* \* \* \* \*